H. S. Heermance.
Umbrella Support.
No. 3,792. Reissued Jan. 11, 1870.
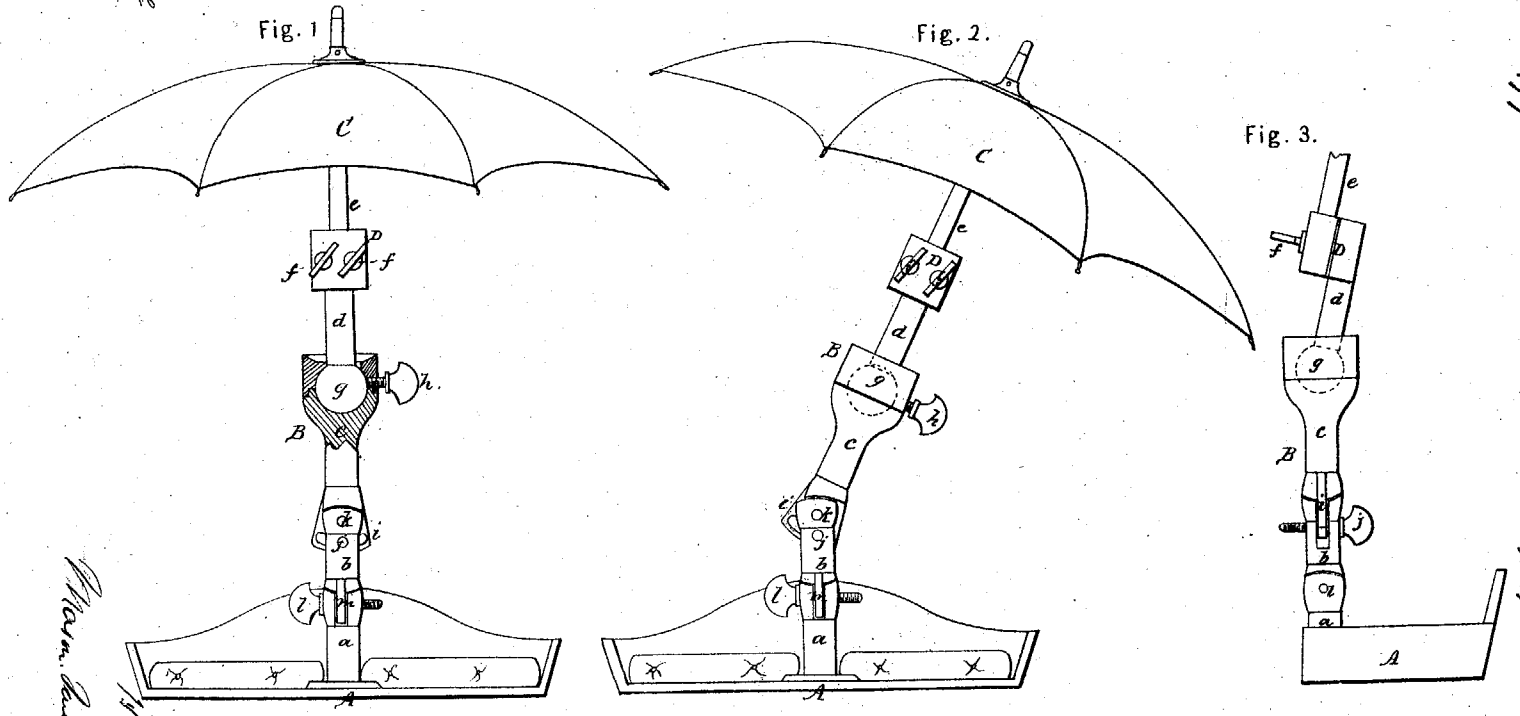
Witnesses
R. J. Campbell
Edw. Schuyler
Inventor
H. S. Heermance
by
Mason, Fenwick & Lawrence

United States Patent Office.

HENRY S. HEERMANCE, OF LENOX, MASSACHUSETTS.

*Letters Patent No.* 63,517, *dated April* 2, 1867; *reissue No.* 3,792, *dated January* 11, 1870.

IMPROVED UMBRELLA-SUPPORTER FOR VEHICLES.

The Schedule referred to in these Letters Patent and making part of the same.

*To all whom it may concern :*

Be it known that I, HENRY S. HEERMANCE, formerly of Claverack, in the county of Columbia, and State of New York, but now of Lenox, in the county of Berkshire, and State of Massachusetts, have invented an Improved Umbrella-Supporter; and I do hereby declare that the following is a full, clear, and exact description of the same, reference being had to the accompanying drawing, forming part of this specification, and in which—

Figure 1 is a front view of an umbrella-supporter, constructed in accordance with my improvement, applied to the seat of a venicle, and adjusted to occupy a vertical position.

Figure 2, a similar view of the same, showing the umbrella inclined to one side.

Figure 3 is a side view, with the canopy portion of the umbrella removed, showing its staff inclined backward.

Similar letters of reference indicate corresponding parts in the several figures.

The object of this invention is to provide for adjusting the staff or support of an umbrella, and setting it at any required angle, for the purpose, among others, of protecting a person, riding in a vehicle or in a pleasure-boat, from the sun or rain.

The invention relates particularly to the construction of the staves of umbrellas, which are secured to some fixed object, such as the open seat of a buggy, or other vehicle; still it is applicable to portable umbrellas, or those which are carried in the hand.

The invention also provides for supporting the staves of a common umbrella, in such manner that the umbrella can be adjusted and fixed at any desired angle from a perpendicular, as will be hereinafter described.

I am aware that parasols or sun-umbrellas have been made with jointed staves, so that the shades could be adjusted at right angles to the staff; but in such instance no provision was made for fixing shades at different angles, or at various angles to the horizon, around a circle or circles from the joint or seat of adjustment as a centre, and it was never contemplated to use them for vehicle-seats.

In the accompanying drawing, I have represented my invention, under one form of construction, applied to the seat A of a vehicle, but it may be applied to a fixed object on any kind of conveyance, where it is desired to protect a person from the sun or rain.

C represents a common umbrella, or canopy portion of one, the staff *e* of which is here shown as secured to the upper end of an adjustable staff or standard, B, by means of a clamp, D, and set-screws *f f*.

This clamp D is applied to a section, *d*, of the standard B, which section has a ball, *g*, formed on its lower end, that is fitted into a socket in the upper end of a section, *c*, as shown in fig. 1.

This ball-and-socket joint will allow the umbrella-staff and upper section *d* to be adjusted at any desired angle, and by means of the set-screw *h* the umbrella can be secured rigidly at such angle.

Below this universal joint, the section *c* is attached to the section *b*, by means of a slotted section, *i*, and pivot *k*, which latter will allow the sections *c* and *d*, with the umbrella-staff *e*, to be adjusted laterally, and, by means of the set-screw *j*, secured at any desired angle.

The short section, *b*, is pivoted to the section *a*, by means of a tenon, *m*, and adjusting-screw *l*, so that the sections *b*, *c*, and *d*, can be adjusted and secured at any desired angle. forward and backward.

The section *a* may be secured to the seat A by screwing its lower end into a plate upon said seat, or in any other suitable manner, which will admit of its removal at pleasure.

It will be seen, from the above description, that each one of the joints of the sectional staff B is provided with means for rendering such joints rigid or flexible at pleasure.

In some cases, a single universal joint and two sections of the standard B will answer the purpose, and for this reason I do not confine my invention to more than one joint.

Instead of using the clamp D for receiving and holding a common umbrella, the umbrella may be applied to the staff *d*, in the same manner that it is applied to the staff *e*.

Instead of employing a ball-and-socket joint, two joints, corresponding to those which connect the sections *a*, *b*, and *c*, may be used. I, however, prefer to use the universal joint.

If the surface of the ball *g* be serrated or roughened in any suitable manner, the friction in its socket will be increased, and less strain will be upon the set-screw *h*.

What is here claimed, and desired to be secured by Letters Patent, is—

1. The combination, with a jointed umbrella-staff or support, for varying its angular position, of set-screws applied to the joints, to secure the umbrella where adjusted, essentially as specified.

2. The combination of the clamp D, ball-and-socket joint *g c*, rod *d*, and standard or support *a*, in the construction of an umbrella-support, substantially as and for the purpose herein set forth.

3. The combination of the joints *j k*, and the ball-and-socket joint *g c*, in the umbrella-support, substantially as described.

4. The combination of the joints *j*, *k*, and *m*, substantially in the manner and for the purpose described.

H. S. HEERMANCE.

Witnesses:
FRED. HAYNES,
R. E. RABEAU.